United States Patent
Wakatsuki et al.

(10) Patent No.: US 8,479,868 B2
(45) Date of Patent: Jul. 9, 2013

(54) MOTOR MOUNTING STRUCTURE OF ELECTRIC VEHICLE

(75) Inventors: Sunao Wakatsuki, Hamamatsu (JP); Shuichi Yamane, Hamamatsu (JP)

(73) Assignee: Suzuki Motor Corporation (JP)

( * ) Notice: Subject to any disclaimer, the term of this patent is extended or adjusted under 35 U.S.C. 154(b) by 119 days.

(21) Appl. No.: 13/305,948

(22) Filed: Nov. 29, 2011

(65) Prior Publication Data

US 2012/0145467 A1  Jun. 14, 2012

(30) Foreign Application Priority Data

Dec. 13, 2010  (JP) ................................ 2010-277184

(51) Int. Cl.
*B60K 1/00* (2006.01)

(52) U.S. Cl.
USPC .......................................... 180/299; 180/291

(58) Field of Classification Search
USPC .......................................... 180/291, 292, 299
See application file for complete search history.

(56) References Cited

U.S. PATENT DOCUMENTS

| | | | | |
|---|---|---|---|---|
| 4,263,980 A | * | 4/1981 | Harlow et al. ............... | 180/292 |
| 5,065,831 A | * | 11/1991 | Murakami ..................... | 180/55 |
| 5,740,876 A | * | 4/1998 | Shimose et al. .............. | 180/232 |
| 6,708,793 B2 | * | 3/2004 | Witherspoon et al. ........ | 180/291 |
| 6,994,178 B2 | * | 2/2006 | Mizuno ......................... | 429/430 |
| 7,144,039 B2 | * | 12/2006 | Kawasaki et al. ............. | 280/784 |
| 7,380,830 B2 | * | 6/2008 | Mitsui et al. ................. | 280/784 |
| 7,413,050 B2 | * | 8/2008 | Miyagawa et al. ........... | 180/291 |
| 7,530,420 B2 | * | 5/2009 | Davis et al. ................... | 180/233 |
| 7,562,737 B2 | * | 7/2009 | Miyahara et al. ............. | 180/291 |
| 7,575,087 B2 | * | 8/2009 | Kim ............................. | 180/299 |
| 7,708,103 B2 | * | 5/2010 | Okuyama et al. ............. | 180/299 |
| 2002/0033594 A1 | * | 3/2002 | Yamamoto et al. ........... | 280/781 |
| 2005/0155806 A1 | * | 7/2005 | Kanehira et al. .............. | 180/291 |

FOREIGN PATENT DOCUMENTS

JP   2008-081009   4/2008

* cited by examiner

*Primary Examiner* — J. Allen Shriver, II
*Assistant Examiner* — Erez Gurari
(74) *Attorney, Agent, or Firm* — Myers Bigel Sibley & Sajovec, P.A.

(57) ABSTRACT

A front cross frame portion (12) is connected to a front cross member (27) provided at a connecting portion (26) between a front floor (6) and a vertical wall portion (7). A rear cross frame portion (13) is fixed to a rear cross member (28) extending along a lower surface side of a rear floor (8) in a vehicle width direction above a differential (16). Thereby, the longitudinal length of a subframe (9) is shortened, the stiffness of the subframe (9) is increased, and the space behind the rear cross frame portion (13) is increased.

4 Claims, 2 Drawing Sheets

MOTOR MOUNTING STRUCTURE OF ELECTRIC VEHICLE

CROSS-RELATED APPLICATIONS

This application claims priority from Japanese Patent Application No. 2010-277184; filed Dec. 13, 2010, the disclosure of which is incorporated herein by reference in its entirety.

FIELD OF THE INVENTION

The present invention relates to a motor mounting structure for an electric vehicle, and in particular, relates to a motor mounting structure for an electric vehicle which supports a powertrain including a motor.

BACKGROUND OF THE INVENTION

In an electric vehicle, a mounting structure is provided to elastically support a powertrain including a motor.

In such a mounting structure, for example, a powertrain is supported at four points from the front, the rear, the left, and the right.

In a motor mounting structure for a vehicle according to JP 2008-81009 A, a powertrain is supported on a subframe which is disposed below a rear floor, by a mounting unit.

BRIEF SUMMARY OF THE INVENTION

However, in JP 2008-81009 A mentioned above, since a front end portion and a rear end portion of the powertrain are supported on the subframe by a front mount and a rear mount, this brings about problems in which the longitudinal length of the subframe is increased, and the stiffness of the subframe is decreased.

Accordingly, an object of the present invention is to provide a motor mounting structure of electric vehicle which causes a powertrain including a motor to vibrate less and reduces the vibration transmitted from the powertrain to a vehicle body.

The present invention is a motor mounting structure of electric vehicle, including: a front floor and a rear floor connected to the front floor with a vertical wall portion therebetween; a subframe being disposed below the rear floor, and including a pair of a left side frame portion and a right side frame portion which extend in a vehicle longitudinal direction and a pair of a front cross frame portion and a rear cross frame portion which connect the two side frame portions to each other; and a powertrain being supported on the subframe by a mounting unit, and including a motor and a transmission which has a differential and is connected to a side portion, in a vehicle width direction, of the motor. The motor mounting structure for an electric vehicle is characterized as follows. Specifically, the front cross frame portion is connected to a front cross member provided at a connecting portion between the front floor and the vertical wall portion. The rear cross frame portion is fixed to a rear cross member extending along a lower surface side of the rear floor in the vehicle width direction above the differential. Both side portions, in the vehicle width direction, of the powertrain are respectively supported on the left side frame portion and the right side frame portion by a left side mount and a right side mount which are arranged in such a manner that positions, in the vehicle longitudinal direction and a vehicle vertical direction, of the left and right side mounts are close to a horizontal line passing through a center of gravity of the powertrain and extending in the vehicle width direction. A front mount and a rear mount for restricting a rolling movement of the powertrain are respectively disposed in front and rear of the powertrain. The front mount is attached to a central portion, in the vehicle width direction, of the front cross frame portion. The rear mount is attached to another cross member disposed behind the subframe.

A motor mounting structure of electric vehicle of the present invention can cause a powertrain including a motor to vibrate less, and can reduce the vibration transmitted from the powertrain to a vehicle body.

DETAILED DESCRIPTION OF THE INVENTION

The present invention now will be described more fully hereinafter in which embodiments of the invention are provided with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise.

Unless otherwise defined, all technical and scientific terms used herein have the same meaning as commonly understood by one of ordinary skill in the art to which this invention belongs.

The present invention achieves an object of causing a powertrain including a motor to vibrate less and reduce the vibration transmitted from the powertrain to a vehicle body, by connecting a front cross frame portion to a front cross member which is provided at a connecting portion between a front floor and a vertical wall portion, and by fixing a rear cross frame portion to a rear cross member which extends along a lower surface side of a rear floor in a vehicle width direction above a differential.

Embodiments

FIGS. 1 to 4 show Embodiments of the present invention.

Figure 3:
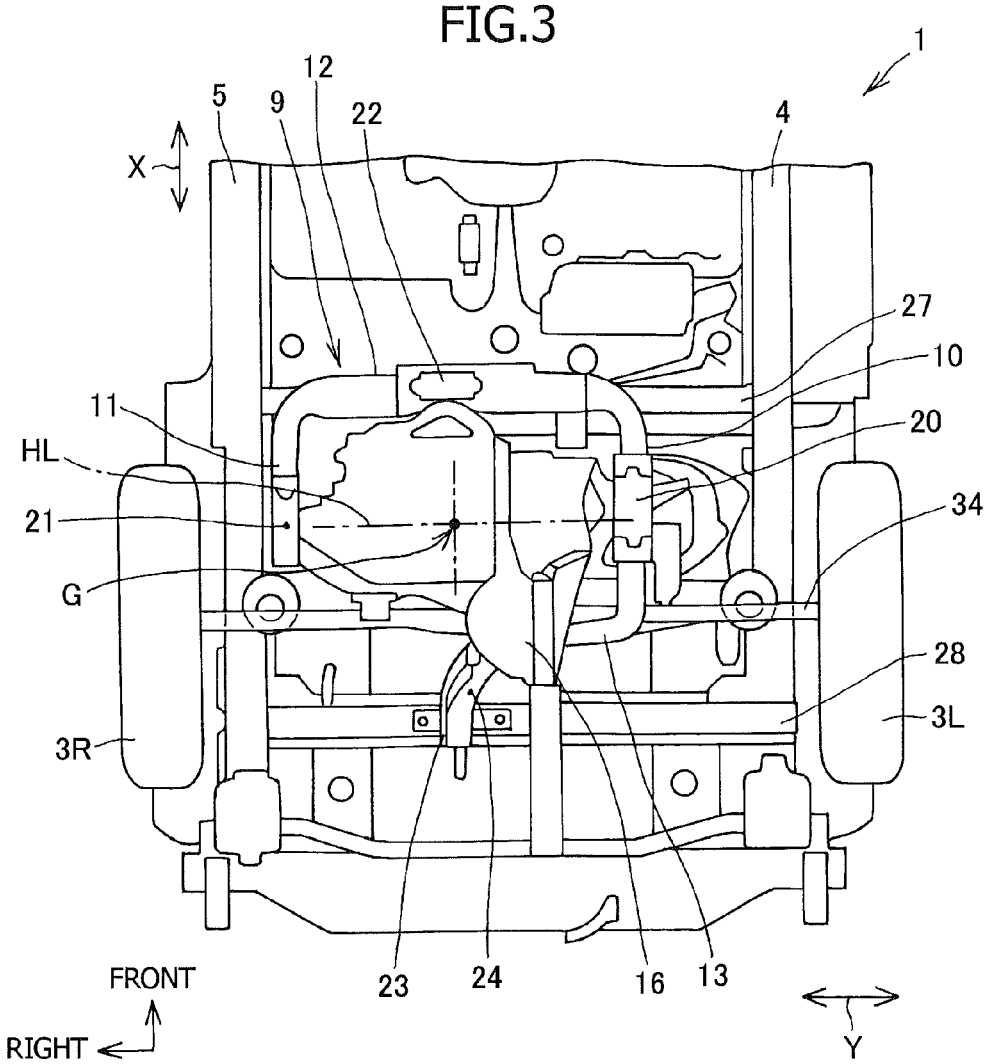
FIG. 3 is a bottom view of the rear portion of the electric vehicle.
Figure 4:
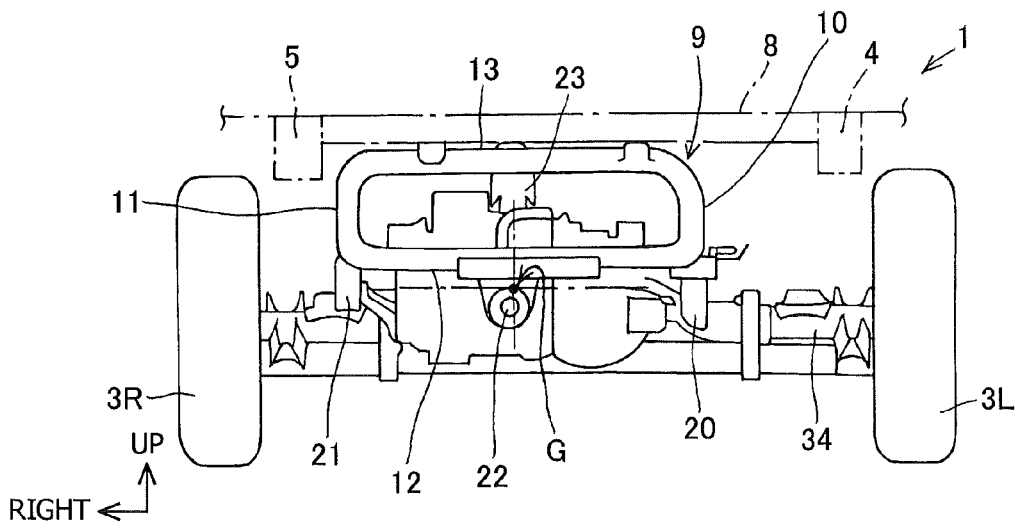
FIG. 4 is a front view of the rear portion of the electric vehicle.

In FIGS. 3 and 4, reference symbol 1 denotes an electric vehicle (hereinafter, referred to as a "vehicle") which is a RR car (rear drive vehicle) such as a commercial vehicle, reference symbol 2 denotes a vehicle body, reference symbol 3L denotes a left rear wheel, and reference symbol 3R denotes a right rear wheel.

The vehicle body 2 includes a pair of a left side member 4 and a right side member 5 which extend in a vehicle longitudinal direction X.

Figure 2:
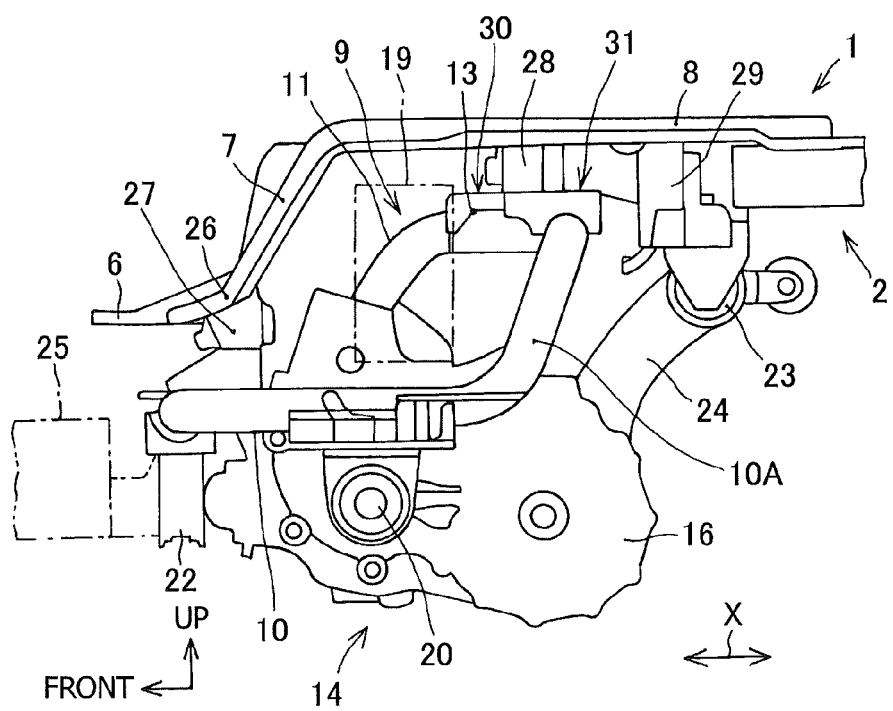
FIG. 2 is a left side view of a rear portion of an electric vehicle.

As shown in FIG. 2, the vehicle body 2 includes a front floor 6 and a rear floor 8 connected to the front floor 6 with a vertical wall portion 7 therebetween.

Below the rear floor 8, a subframe 9 is disposed.

Figure 1:
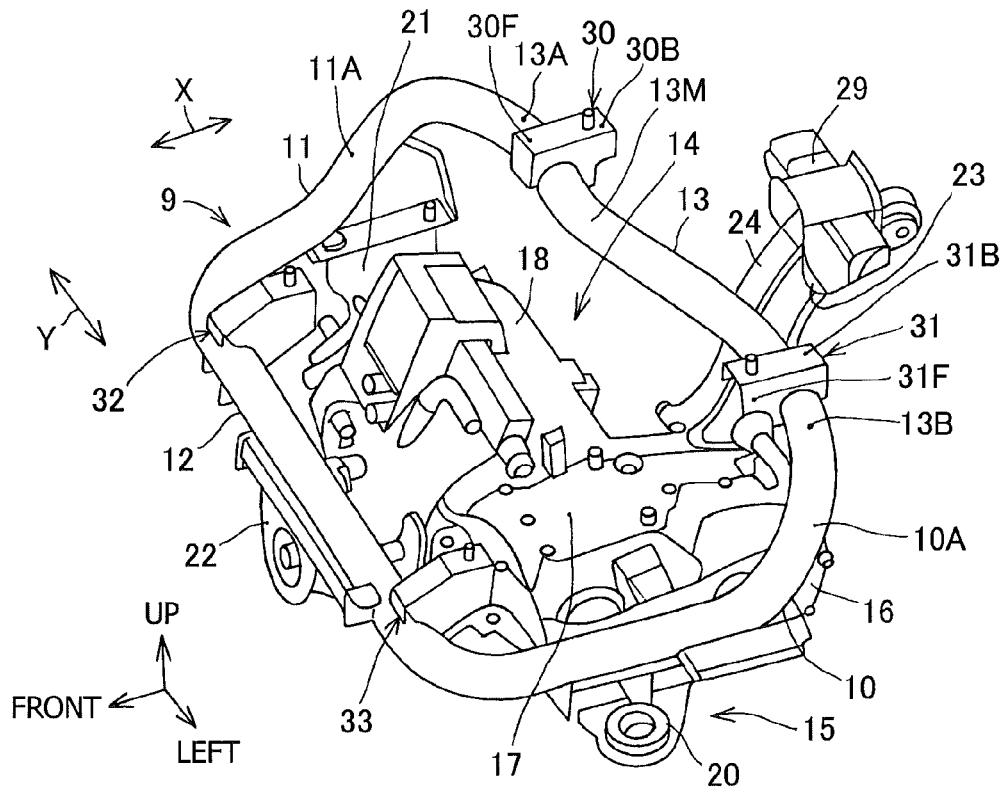
FIG. 1 is a perspective view of a powertrain supported on a subframe.

As shown in FIGS. 1 and 2, the subframe 9 integrally includes: a pair of a left side frame portion 10 and a right side frame portion 11 which extend in the vehicle longitudinal direction X; and a pair of a front cross frame portion 12 and a rear cross frame portion 13 which connect the two side frame portions 10 and 11 to each other. In the left side frame portion 10 and the right side frame portion 11, rising portions 10A and 11A are respectively formed and rise upward at rear portions of the left side frame portion 10 and the right side frame portion 11. Thereby, the rear cross frame portion 13 is disposed at a higher position than the front cross frame portion 12.

A powertrain 14 is supported on the subframe 9 by a mounting unit 15. In other words, the subframe 9 is formed to have a shape of a closed circuit in such a manner as to surround the powertrain 14.

As shown in FIG. 1, the powertrain 14 is constituted of a transmission 17 with a differential (motor gearbox) 16 and a motor 18. The transmission 17 is connected to a left side portion, in a vehicle width direction Y, of the motor 18. The powertrain 14 is disposed in such a way that a longitudinal direction thereof is parallel to the vehicle width direction Y that is a direction perpendicular to the vehicle longitudinal direction X.

As shown in FIG. 2, a battery (12 V) 19 is disposed above the transmission 17.

The mounting unit 15 has a rubber mounting structure, and includes: a left side mount 20 for supporting a left side portion of the powertrain 14 on the left side frame portion 10; a right side mount 21 for supporting a right side portion of the powertrain 14 on the right side frame portion 11; a front mount 22 for supporting the center of a front portion of the powertrain 14 on the front cross frame portion 12; and a rear mount 23 for supporting the center of a rear portion of the powertrain 14 on a suspension cross member 29, described later. The mounting unit 15 elastically supports the powertrain 14 at four points on the vehicle body 2. The rear mount 23 is fixed to the differential 16 with a rear mount bracket 24.

As shown in FIG. 2, a battery unit 25 for supplying the power to the motor 18 is disposed in front of the front mount 22.

As shown in FIG. 2, the front cross frame portion 12 is connected to a front cross member 27 provided at a connecting portion 26 between the front floor 6 and the vertical wall portion 7.

Meanwhile, the rear cross frame portion 13 is fixed to a rear cross member 28 provided at the rear floor 8 and extending along a lower surface side of the rear floor 8 in the vehicle width direction Y above the differential 16.

As shown in FIGS. 3 and 4, both side portions, in the vehicle width direction Y, of the powertrain 14 are respectively supported on the left side frame portion 10 and the right side frame portion 11 by the left side mount 20 and the right side mount 21 which are side mounts arranged in such a manner that positions, in the vehicle longitudinal direction X and a vehicle vertical direction, of the side mounts are close to a horizontal line HL passing through a center of gravity G of the powertrain 14 and extending in the vehicle width direction Y.

In front and rear of the powertrain 14, the front mount 22 and the rear mount 23 are respectively disposed for restricting a rolling movement of the powertrain 14.

The front mount 22 is attached to a central portion, in the vehicle width direction, of the front cross frame portion 12.

The rear mount 23 is attached to the suspension cross member 29 provided at the rear floor 8 as another cross member disposed behind the rear cross frame portion 13 of the subframe 9.

As described above, the front cross frame portion 12 is connected to the front cross member 27 provided at the connecting portion 26 between the front floor 6 and the vertical wall portion 7, and the rear cross frame portion 13 is fixed to the rear cross member 28 extending along the lower surface side of the rear floor 8 in the vehicle width direction Y above the differential 16. Accordingly, this makes it possible to shorten the longitudinal length of the subframe 9, increase the stiffness of the subframe 9, and increase the space behind the rear cross frame portion 13.

Furthermore, the left side mount 20 and the right side mount 21 supports the powertrain 14 in such a manner as to allow the powertrain 14 to perform the rolling movement around the horizontal line HL passing through the center of gravity G and extending in the vehicle width direction Y. The front mount 22 and the rear mount 23 restrict the rolling movement of the powertrain 14.

Therefore, during the rolling movement of the powertrain 14, vibration transmitted from the left side mount 20 and the right side mount 21 to the subframe 9 can be reduced.

In addition, since the rear mount 23 is connected to the suspension cross member 29 that is another cross member disposed behind the subframe 9, this makes it possible to dispose the rear mount 23 at a position away from the center of the rolling movement without extending the subframe 9 rearward in the vehicle longitudinal direction. Therefore, the load applied to the rear mount 23 by the rolling movement can be reduced.

For this reason, the spring constant of the rear mount 23 can be set low, and the vibration transmitted from the powertrain 14 to the vehicle body 2 can be reduced.

In addition, it is possible to assemble the rear mount 23 to the suspension cross member 29 without hindrance by the subframe 9, and the assemblability is improved.

As shown in FIG. 1, the subframe 9 is formed of a pipe (tube member) in an annular shape (i.e., in the shape of a closed circuit).

Thereby, the bending stiffness of the subframe 9 is improved, and the vibration transmitted from the front cross member 27 and the rear cross member 28 to the vehicle body 2 can be reduced.

The rear cross frame portion 13 has a shape curved at a middle portion 13M in such a manner that a portion 13A located on the motor 18 side in the vehicle width direction Y is positioned frontward in the vehicle longitudinal direction relative to a portion 13B located on the differential 16 side.

Since the rear cross frame portion 13 has a curved shape as described above, the circumference of the subframe 9 is shortened, and thereby vibration of the subframe 9 can be suppressed.

As shown in FIGS. 1 and 2, the rear cross frame portion 13 is fixed to the rear cross member 28 with a motor rear side attachment bracket 30 disposed on the motor 18 side in the vehicle width direction Y and a differential side rear attachment bracket 31 disposed on the differential 16 side.

Furthermore, the motor side rear attachment bracket 30 disposed on the motor 18 side protrudes rearward in the vehicle longitudinal direction from the rear cross frame portion 13. Specifically, the motor side rear attachment bracket 30 is disposed in such a manner that a rear portion 30B in a longitudinal direction thereof is formed larger than a front portion 30F thereof in relation to the rear cross frame portion 13. In addition, the differential side rear attachment bracket 31 disposed on the differential 16 side protrudes frontward in the vehicle longitudinal direction from the rear cross frame portion 13. Specifically, the differential side rear attachment bracket 31 is disposed in such a manner that a front portion 31F in a longitudinal direction thereof is formed larger than a rear portion 31B thereof in relation to the rear cross frame portion 13.

As described above, the two motor side rear attachment bracket 30 and differential side rear attachment bracket 31 are different from each other in protruding direction from the rear cross frame portion 13. Thereby, deformation of the motor side rear attachment bracket 30 and the differential side rear attachment bracket 31 can be suppressed. Therefore, the vibration transmitted from the subframe 9 to the vehicle body 2 can be reduced.

In addition, as shown in FIG. 1, the front cross frame portion 12 is fixed to the front cross member 27 with a motor side rear attachment bracket 32 disposed on the motor 18 side in the vehicle width direction Y and a differential side front attachment bracket 33 disposed on the differential 16 side. In this case, the motor side rear attachment bracket 32 and the differential side front attachment bracket 33 are disposed on the front cross frame portion 12 toward the rear side of the vehicle.

Furthermore, as shown in FIGS. 3 and 4, the differential 16 is connected to a rear axle shaft 34 which is connected to the left rear wheel 3L and the right rear wheel 3R.

A motor mounting structure for an electric vehicle according to the present invention is applicable also to other passenger cars that are RR cars.

Having thus described certain embodiments of the present invention, it is to be understood that the invention defined by the appended claims is not to be limited by particular details set forth in the above description as many apparent variations thereof are possible without departing from the spirit or scope thereof as hereinafter claimed.

What is claimed is:

1. A motor mounting structure for an electric vehicle, comprising:
    a front floor and a rear floor connected to the front floor with a vertical wall portion therebetween;
    a subframe being disposed below the rear floor, and including a pair of a left side frame portion and a right side frame portion which extend in a vehicle longitudinal direction, and a pair of a front cross frame portion and a rear cross frame portion which connect the two side frame portions to each other; and
    a powertrain being supported on the subframe by a mounting unit, and including a motor and a transmission which has a differential and is connected to a side portion, in a vehicle width direction, of the motor;
    wherein the front cross frame portion is connected to a front cross member provided at a connecting portion between the front floor and the vertical wall portion;
    wherein the rear cross frame portion is fixed to a rear cross member extending along a lower surface side of the rear floor in the vehicle width direction above the differential;
    wherein both side portions, in the vehicle width direction, of the powertrain are respectively supported on the left side frame portion and the right side frame portion by a left side mount and a right side mount which are arranged in such a manner in which positions, in the vehicle longitudinal direction and a vehicle vertical direction, of the left and right side mounts are close to a horizontal line passing through a center of gravity of the powertrain and extending in the vehicle width direction;
    wherein a front mount and a rear mount for restricting a rolling movement of the powertrain are respectively disposed in front and rear of the powertrain;
    wherein the front mount is attached to a central portion, in the vehicle width direction, of the front cross frame portion; and
    wherein the rear mount is attached to another cross member disposed behind the subframe.

2. A motor mounting structure of electric vehicle according to claim 1, wherein
    the subframe is formed of a pipe in an annular shape.

3. A motor mounting structure of electric vehicle according to claim 1, wherein
    the rear cross frame portion has a shape curved at a middle portion in such a manner in which a portion located on the motor side in the vehicle width direction is positioned frontward in the vehicle longitudinal direction relative to a portion located on the differential side.

4. A motor mounting structure of electric vehicle according to claim 1, wherein
    the rear cross frame portion is fixed to the rear cross member with an attachment bracket disposed on the motor side in the vehicle width direction and an attachment bracket disposed on the differential side, and
    the attachment bracket disposed on the motor side protrudes rearward in the vehicle longitudinal direction from the rear cross frame portion, while the attachment bracket disposed on the differential side, protrudes frontward in the vehicle longitudinal direction.

* * * * *